Sept. 24, 1935.                F. TUPTA                2,015,444
                               AEROPLANE
                           Filed Aug. 12, 1932

INVENTOR.
Frank Tupta.
BY
George V. Woodling
ATTORNEY.

Patented Sept. 24, 1935

2,015,444

UNITED STATES PATENT OFFICE 2,015,444

AEROPLANE

Frank Tupta, Cleveland, Ohio

Application August 12, 1932, Serial No. 628,493

7 Claims. (Cl. 244—29)

My invention relates to aeroplane wings which are movable and which are used to control the aeroplane.

The object of my invention is to provide improvements in controlling means for an aeroplane, by means of which greater efficiency and safety in operation may be obtained.

Another object is to provide movable dragging means for an aeroplane.

Still another object is to provide dragging means which may be withdrawn from active operation.

Other objects and a fuller understanding of my invention may be had by referring to the following description and claims, taken in conjunction with the accompanying drawing, in which like parts are designated by like reference characters, in which Figure 1 represents a view looking down upon an aeroplane which is equipped with my invention.

Figures 1, 2, 3:
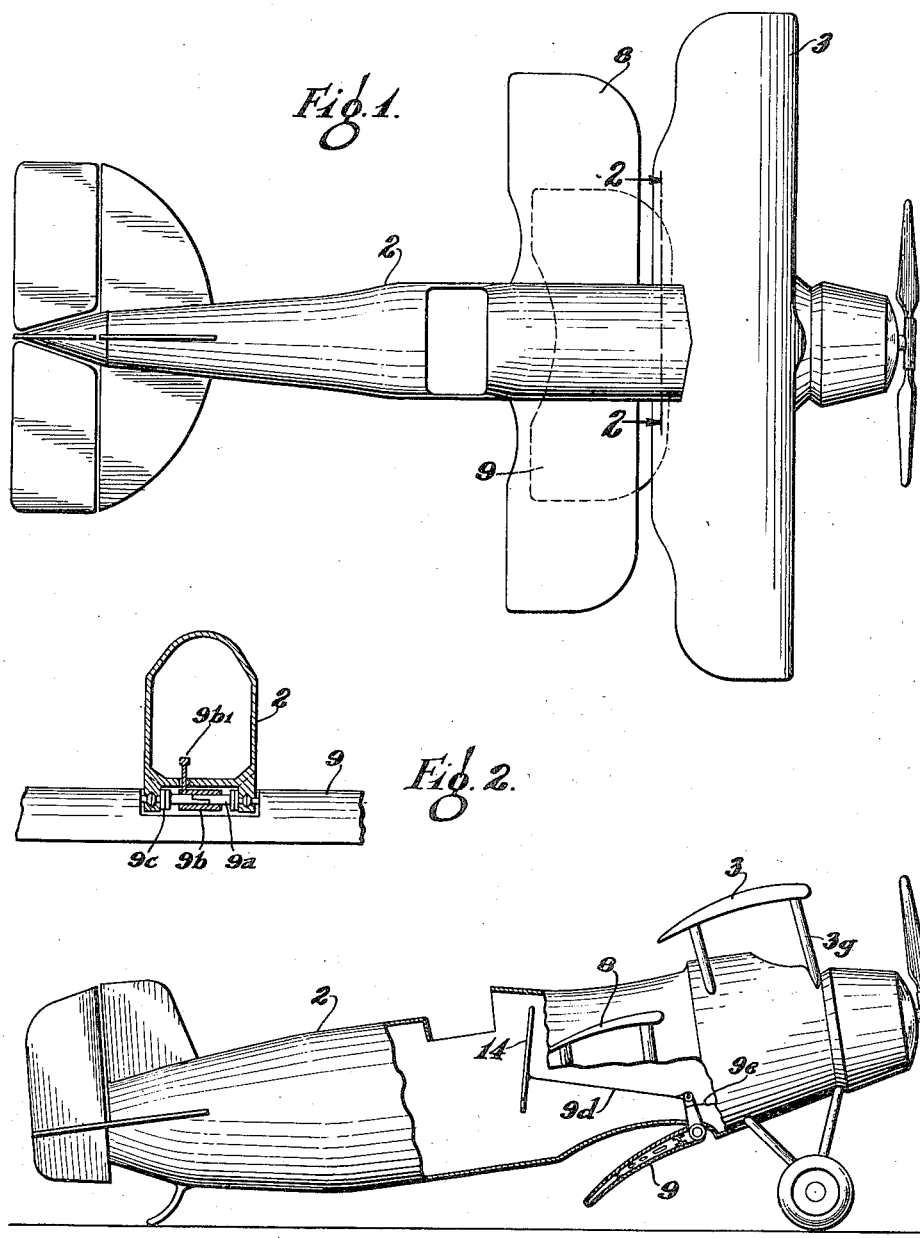
Figure 2 is a cross sectional view of a cut at 2—2 of the fuselage, lower wing mounting, and the lower wing.
Figure 3 is a side view of an aeroplane equipped with my invention, portions being cut away to show the mounting and operating mechanism and to show a cross section of the lower wing.

My invention is illustrated in these views, by the lower or drag wing 9 mounted upon the lower part of the aeroplane fuselage 2, which is used for the purpose of braking and for the better control of the aeroplane, together with the mounting of the lower wing 9 and the operating mechanism connected therewith.

The reference character 2 represents a fuselage having six sides, the vertical sides being the widest.

The reference character 3 represents the stationary wing or aerofoil mounted on posts (3g) set on the upper front portion of the fuselage.

In staggered relation to these aerofoils are shown stationary wings or aerofoils 8, at a lower level.

The lower or drag wings are shown by the reference character 9, which wings are hinged upon the shaft (9a) that passes transversely through the fuselage 2 and is shown in Figure 3.

The wings 9 are employed to raise the front end of the plane more or less vertically when the plane is rising and when the propeller is turning, according to the vertical angle at which the wings may be directed, and to direct the angle of attack when landing.

The transverse shaft 9a for the movable aerofoil 9, is constructed in two sections interlocked by the coupling 9b, and is flanged at 9c. The entire shaft is mounted in complementary bearings in the fuselage, thus preventing the shaft from slipping as shown in Figure 2.

When the plane is to ascend within a relatively small ground space, the movable wings 9 are inclined at the time of raising the plane by means of the arm 9b', which is secured to the shaft 9a and the hand or pedal lever 14 and rope 9d. An extensionable attachment 9e is fastened to the arm 9b' and anchored to the frame for the purpose of facilitating the operating of the lower wing 9.

When not in active operation the lower wing 9 is held in a retracted position under the fuselage 2 within the bottom cavity or recess in the bottom of the fuselage.

In the operation of the plane, in order to provide a dragging effect in the control of the plane, the lower wing 9 is brought into play.

To operate the lower wing 9, the lever 14 or other suitable leverage means is pulled back by the aviator. The lever 14 pulls on the rope 9d which is attached thereto. The rope 9d in turn pulls upon the arm 9b' to which it is attached. The pulling back of the arm 9b' turns the shaft 9a, the arm 9b' being rigidly mounted on the shaft 9a. The turning of the shaft 9a causes the lower wing 9, which is secured on its front edge to the said shaft 9a, to rotatively turn with the said shaft 9a. The rotative turning of the lower wing 9 causes it to leave its position in the bottom cavity of the fuselage 2 and to assume a position at an angle to the fuselage 2.

As the lower wing 9 assumes a greater angle to the fuselage 2, a greater resistance to the air currents is set up and thereby greater dragging means are effected. Since the lower wing 9 may be quickly set at varied angles, any required dragging effect may be had.

When no dragging effect is required, the operating procedure is reversed and the lower wing 9 is retracted into the cavity or recess in the bottom of the fuselage 2, and is positioned parallel to the fuselage 2.

In the adaptation of my invention illustrated, the lower wing 9 has a central or intermediate portion and two side portions. Each side portion extends from opposite sides of the central or intermediate portion. When the lower wing 9 is retracted to a position parallel with the fuselage 2, the central or intermediate portion is contained in the cavity or recess of the fuselage 2 and the two side portions extend from opposite sides of the fuselage 2.

Although I find the illustrated lower wing 9 to be the preferable, the lower wing 9 may be without the two side portions and may be totally retractable into the cavity or recess in the bottom of the fuselage 9.

In the operation of the lower wing 9, as described, I have set forth a simple method of control. However, the operating means of the lower wing 9 may be so inter-connected with the tail rudder and vanes and with the upper wings, that the movements of the plane parts are harmoniously controlled from a common system of levers.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

Having described the invention, what I claim as new and desire to secure by Letters Patent is:

1. In an aeroplane, in combination a fuselage, staggered upper and lower wings thereon, and a movable wing, pivoted in said fuselage at a lower level, said lower wing having a central drag portion movable therewith, said intermediate portion being normally received within and forming the bottom surface of said fuselage.

2. In an aeroplane, a fuselage having a bottom cavity intermediate of its ends, a wing pivoted in the sides of said fuselage, normally withdrawn into said cavity and provided with a central portion, said central portion being positioned when opened to serve as a drag for said plane.

3. In an aeroplane, a fuselage having a bottom cavity intermediate of its ends, a wing pivoted in the sides of said fuselage, normally withdrawn into said cavity and provided with a central portion, said central portion being positioned when opened to serve as a drag for said plane, said drag portion of said wing when closed conforming in shape to the external surface of said fuselage.

4. In an aeroplane, in combination, a fuselage having a depressed portion in the bottom thereof, a movable wing connected to the fuselage, said movable wing having two side portions and a central drag portion adapted to be normally drawn into the depressed portion, each of which side portions extends on opposite sides of the fuselage, and means for actuating the movable wing to any desired operating position.

5. In an aeroplane, in combination, a fuselage having a depressed portion in the bottom thereof, a laterally disposed shaft rotatively mounted in the fuselage, a movable wing connected to the rotatively mounted shaft and adapted to be moved relative to the fuselage and to be drawn into the depressed portion, and means for actuating the rotatively mounted shaft to control the position of the movable wing.

6. In an aeroplane, in combination, a fuselage having a depressed portion in the bottom thereof, a movable wing connected to the fuselage, and normally withdrawn into said depressed portion of the fuselage, and means for actuating the movable wing to any desired operating position.

7. In an aeroplane, in combination, a fuselage having a depressed portion in the bottom thereof, a rotatively mounted shaft mounted on the fuselage, a movable wing connected to the rotatively mounted shaft, said wing being normally withdrawn into said portion, and means for actuating the shaft to control the operating position of the movable wing.

FRANK TUPTA.